United States Patent [19]
Snelling

[11] Patent Number: 5,813,363
[45] Date of Patent: Sep. 29, 1998

[54] AUTOMATIC LIQUID DISPENSER FOR ANIMALS

[76] Inventor: David A. Snelling, 3316 Caribbean Dr., Mesquite, Tex. 75150-1717

[21] Appl. No.: 871,342

[22] Filed: Jun. 9, 1997

[51] Int. Cl.⁶ ..................................................... A01K 7/00
[52] U.S. Cl. ................................................................. 119/73
[58] Field of Search ................................ 119/72, 73, 74, 119/75–80

[56] References Cited

U.S. PATENT DOCUMENTS

| | | | |
|---|---|---|---|
| 3,306,263 | 2/1967 | Johnson | 119/73 |
| 3,636,312 | 1/1972 | Dreher et al. | 119/73 |
| 4,584,966 | 4/1986 | Moore | 119/73 |
| 4,630,569 | 12/1986 | Dieleman | 119/74 |
| 4,986,221 | 1/1991 | Shaw | 119/73 |
| 5,025,754 | 6/1991 | Plyler | 119/73 |

*Primary Examiner*—Thomas Price
*Attorney, Agent, or Firm*—Harold Levine Esq P.C.

[57] ABSTRACT

An automatic dispenser for providing animals with cool fresh liquid (e.g., water). The feeder has self-cleaning and self-refilling features that provide periodic replacement of hot, stale or dirty fluid with cool fresh refills. Solenoid valves are controlled by one or more liquid sensors, a time delay relay, timer and optional thermostat to provide flexibility and customizing of drain/refill cycles as desired in order to reflect varying ambient conditions in which the equipment is operated. Provision is also made for remote actuation of drain and refill cycles.

20 Claims, 9 Drawing Sheets

AUTOMATIC LIQUID DISPENSER FOR ANIMALS

AUTOMATIC LIQUID DISPENSER FOR ANIMALS

This invention relates to the dispensing of liquid to animals and more particularly to the customizible automatic control of providing liquids to household pets.

BACKGROUND OF THE INVENTION

Self-cleaning watering devices have heretofore been known, illustrative of which is that disclosed in U.S. Pat. No. 3,921,587 granted to William E. Schnee Nov. 25, 1975. That patent describes what is said to be a water fountain which includes a mechanical float valve to control the level of liquid in an open container; and thus due to the operation of the float valve, the device was said to operate automatically. Thus, when the level declines to a predetermined point, the float valve is opened to permit the entry of water until the level rises to another predetermined point at which time the valve is closed. The fill water is dispensed adjacent the upper edge of the interior sides to wash the sides during each water fill operation, thus washing sediment or debris adjacent the sides into the body of water wherein it settles on the bottom. The bottom surface is undulated so as to urge settled sediment and debris to accumulate in troughs, and a mechanically operated dump valve is positioned in a drain leading from the troughs so that when it is opened, the accumulated settled sediment and debris are exhausted.

Other proposals representative of the prior art are found in U.S. Pat. Nos. 1,092,250, 1,218,899, 2,165,753 and 2,724,365.

While the proposals of the prior art appear to offer attractive features, there have been certain drawbacks. Thus, for example, in U.S. Pat. No. 3,921,587 patent there is no provision for draining the receptacle other than manually through conventional gate valve 47, thus requiring manual attendance when draining of sediment and debris is desired.

It is known that some animals, especially pets or those in zoos, are often confined to relatively small quarters which may not have adequate shade to protect necessary liquids such as their drinking water from the heat of the sun. Moreover, in warm climates, the heat of the sun may cause the water temperature to rise to a point at which it discourages the animal from drinking the very water it may badly need to help it stay cool.

In addition to the foregoing, there has been a need for dependably assuring availability of unfrozen water during times when temperatures drop below freezing. Accordingly, although the proposals of the prior art have evidenced certain advantages, there has nevertheless remained the need for a relatively simple and dependable way of ensuring that cool refreshing fluids, e.g., water, are readily and automatically available for animals.

BRIEF SUMMARY OF THE INVENTION

The improvement according to the invention hereof includes apparatus and method for providing cool drinking water for animals during hot weather. Also provided as an optional addition are provisions for providing cool water that has been kept from freezing during cold weather. Included are a float for sensing fluid level within a dispensing dish, a time delay relay for providing an adjustable time delay following actuation of the float, an adjustable timer for timing draining of water, and electrically-operated valves for controlling intake and exhaust of the water from its dispensing receptacle, e.g., dish.

For cold weather operation, the aforementioned cold weather option includes one or more thermostats for sensing air and/or water temperature of water within the dish and a recirculating heater through which the water of the dish is recirculated when its temperature drops to an adjustable level slightly above freezing. Another optional feature includes provisions for preventing freezing of water within an inlet hose or conduit.

To operate the equipment in its automatic warm weather mode, the adjustable time clock is set for the daily or weekly time or times that drainage and replacement of fluid are desired; and the adjustable time-delay relay is set to provide for a time to permit drainage before replacement fluid is permitted to enter.

When the timer (e.g., time clock) progresses to a time for which it is set, it closes contacts that energize a drain valve, and the fluid begins draining from its container. When it reaches a predetermined level, the float valve is actuated. However, the adjustable time-delay relay prevents energization of the refill (i.e., intake) valve(s) until it times out, thus permitting complete or partial drainage of fluid (as desired) before replacement fluid is permitted to flow into the container. Since the interval during which the time clock contacts are closed is adjustable, it can be adjusted to an interval long enough after the float valve is actuated to flush through the fluid receptacle any hot fluid such as water that may have been heated by the sun while resident within a garden hose or the like that may be used to conduct fluid to the receptacle intake.

In another hot weather embodiment, a temperature sensing element (e.g., thermostat) may be positioned to monitor temperature of the fluid in the dispensing dish; and electrical contacts of such element may be connected to the drain valve, thus providing an alternate or supplementary means for draining excessively hot water from the dispensing dish. In either event, when the system is in operation, automatic entry of flushing-replacement fluid occurs at the preset time delay of the adjustable time-delay relay after the fluid level drops to a predetermined level thereby actuating the float valve. The float valve is adjustably set to actuate at a level above empty, thus providing enough fluid for the animal to continue drinking, if desired, while the time delay timer times out and before replacement fluid is introduced.

In the cold weather mode, the existing water in the dish is circulated through a heater when its temperature drops to the aforementioned adjustable level a little above freezing. However, for extended periods of below freezing temperature, additional provision must be made for preventing freezing of source water within the connecting conduit, e.g., garden hose, in order for the periodic filling-flushing cycle to be operative. Thus in accordance with one of the foregoing options, provision may be included for insulating and warming the inlet conduit to ensure continuity of available unfrozen water.

OBJECTS AND FEATURES OF THE INVENTION

It is one general object of the invention to improve conditions under which fluids are dispensed to animals.

It is another object of the invention to facilitate customizing of operation of an automatic fluid-dispensing system.

It is yet another object of the invention to provide for periodically supplying cool fresh fluid, e.g., water, to animals.

It is still one further object of the invention to provide for flushing heated water that may be resident in one or more supply conduits.

Accordingly, in accordance with one feature of the invention, provision is made for automatic draining of fluid from the liquid dispensing dish by either or both of an adjustable timer and a liquid temperature sensing element, thereby facilitating the draining of unpalatable fluid from the dish.

In accordance with another feature of the invention, a time delay relay is connected with liquid level sensing element for imposing an adjustable delay in time between the time when the liquid level sensing element senses reduction of liquid to an adjustable level and the time when an intake valve is actuated, thus ensuring that when complete draining is desired, such will occur.

In accordance with still another feature of the invention, provision is made for retaining the drain valve in its open condition, once it is opened, for a long enough period of time to overlap the period during which the intake valve is opened, thus providing for the passage through the dish of all the water that may have been excessively heated (e.g., by the sun or other means) while resident within a connected hose (e.g., a garden hose connecting the dish with a faucet) thus facilitating the refilling of the dish with fresh and cool water.

In accordance with yet another feature of the invention, a second intake valve may be included to provide an alternate source of fluid for supplying the aforementioned dish, thus contributing to versatility and dependability of animal watering.

These and other objects and features of the invention will be apparent from the following description, by way of example of preferred embodiments, with reference to the drawing.

DESCRIPTION OF A PREFERRED EMBODIMENT

Figure 1:
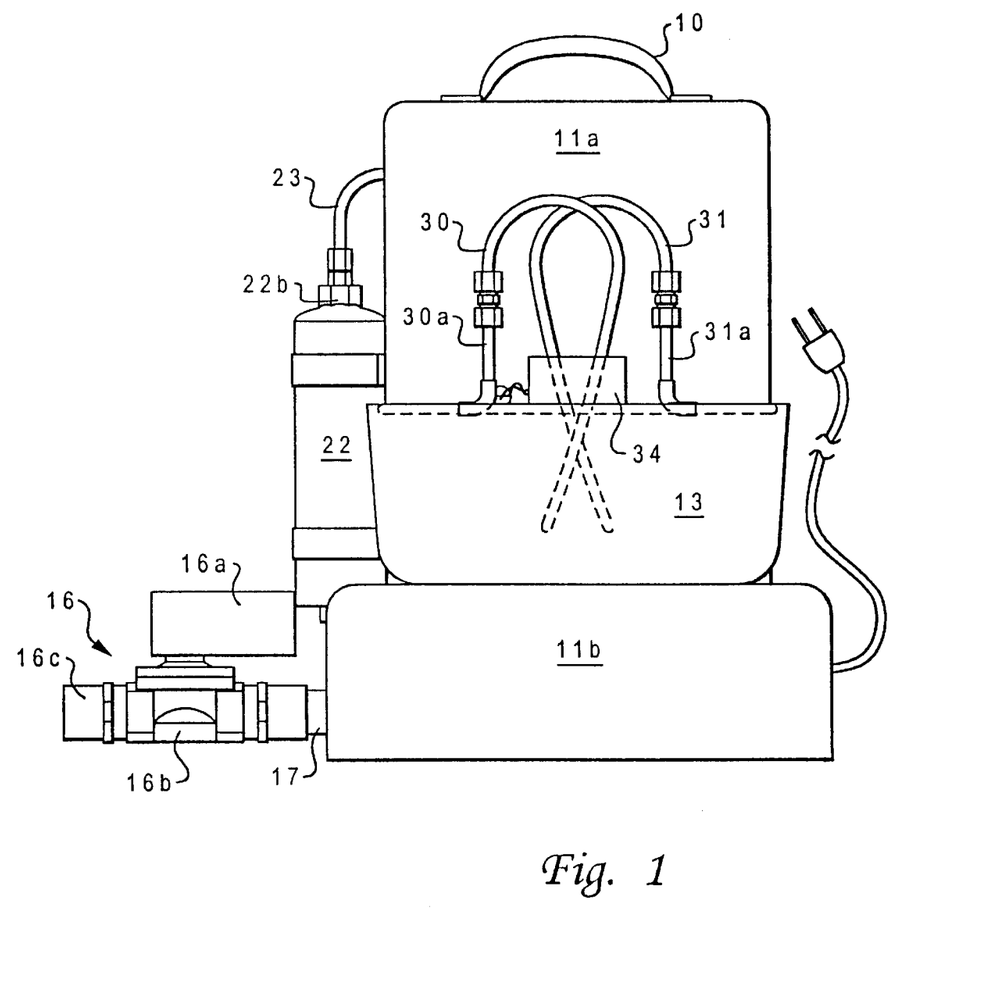
FIG. 1 is a front view depicting the preferred embodiment of the apparatus according to the invention.
Figure 2:
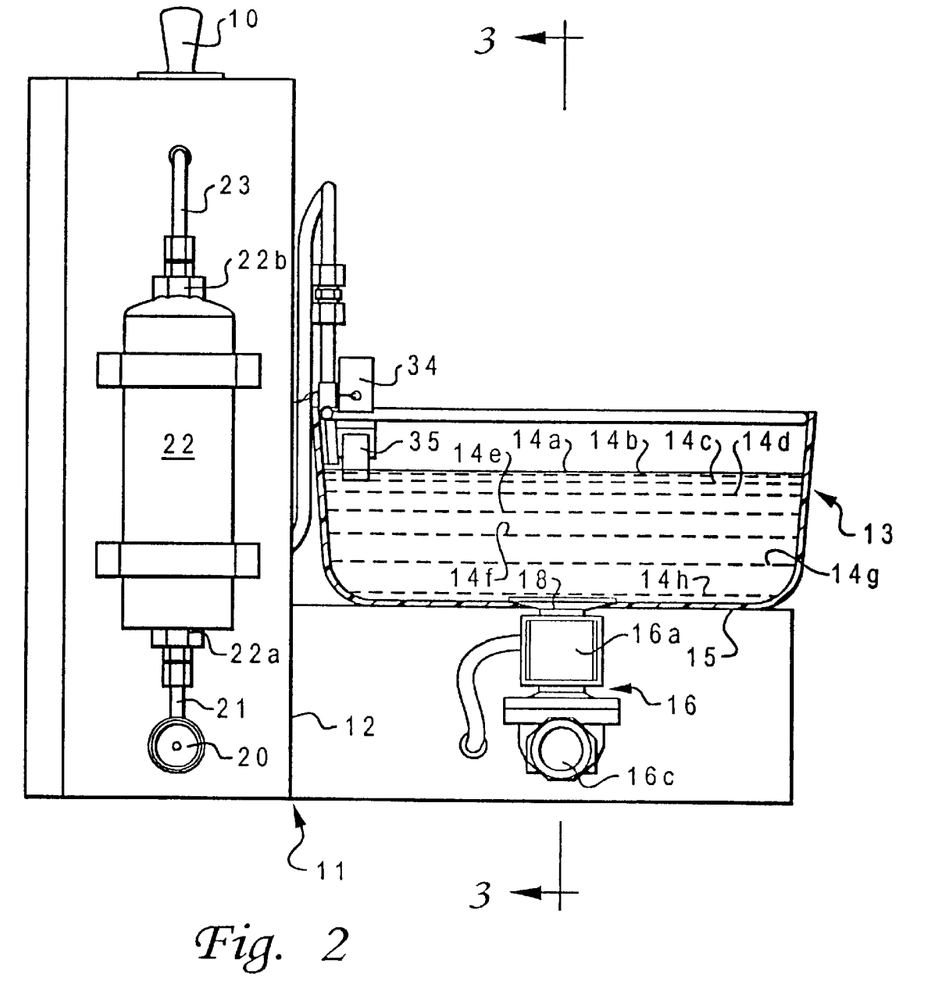
FIG. 2 is a side view depicting the left side of the embodiment of FIG. 1.

Now turning to the drawing, and more particularly FIG. 1 thereof, there will be seen the aforementioned front view of the preferred embodiment of the invention. There is seen the upstanding and longitudinally extending parts 11a and 11b of main frame 11 (FIG. 2). At the top of upstanding part 11A, there is preferably included a handle 10 provided to facilitate lifting and moving the assembly from one location to another. As illustrated in FIG. 2, these parts may be separately constructed and affixed together as at adjoining line 12. Resting upon and supported by part 11b is dish 13 which, in FIG. 2, is partly cut-away to show levels 14a–14h of liquid (e.g., water) normally contained therein. Also shown is interior bottom 15, solenoid-actuated drain valve 16 comprised of solenoid actuator 16a and valve 16b. Extending outwardly from valve 16b is a conventional connector 16c which provides for attachment of an optional fluid waste conduit such as, for example, a conventional garden hose. At the inboard end 16d of valve 16 there is an extending fluid-conducting part 17 for fluid communication with drain 18 which is located in the lowest part of the bottom 15. It will thus be evident that fluid may be drained from dish 13 by opening solenoid valve 16 to permit fluid to flow by gravity from the interior of the dish through fluid communicating part 17 and valve 16b to connector 16c which acts as an exit port for fluid draining from dish 13.

Figure 3A:
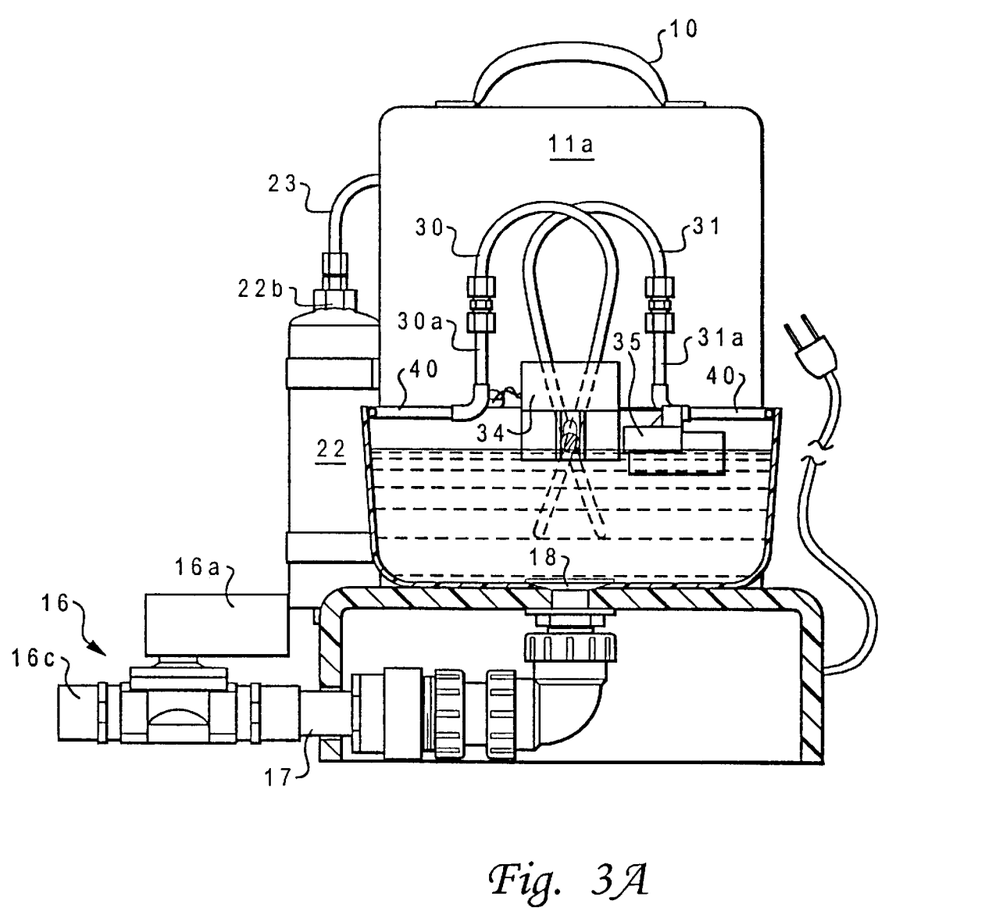
FIG. 3A is a sectional view taken along the section lines 3—3 of FIG. 2.
Figure 3B:
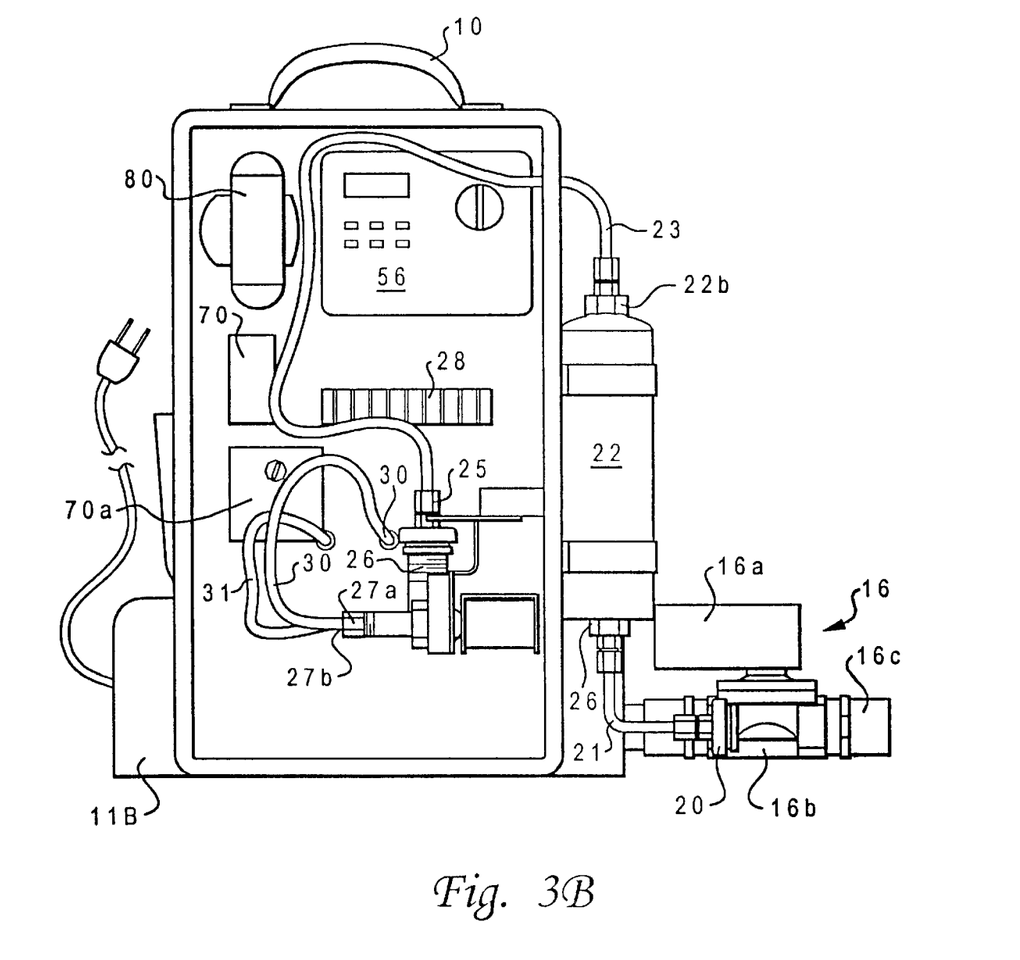
FIG. 3B is a rear view with the back exterior panel removed to expose the interior of the upstanding part of the apparatus to view.

Fluid is introduced to the dish 13 through intake 20 which preferably is a conventional hose or tubing fitting adapted for connection of a garden hose or metallic tubing. Fluid thus communicated is conducted through intake 20 and tubing 21 to the intake 22a of optional filter 22 through which it passes and then exits through filter exit port 22b whence it is conducted via tubing 23 to the interior of the enclosure (FIG. 3B) and thence to the input 25 of solenoid operated intake valve 26. Valve 26 has two solenoid coils 26a and 26b (FIG. 7) together with two outlets 27a and 27b which connect respectively with tubes 30 and 31. The remaining components illustrated within the interior of the enclosure of FIG. 3B are time delay relay device 70a, time delay relay coil 70, 120 to 24 volt a-c transformer 80, timer 56, and electrical wiring terminal block 28.

As will observed from further reference to the figures, there are provided: (1) a float valve 35 for initiating the refilling of the bowl when fluid level declines to an adjustable predetermined level; and (2) one or more thermostatic elements 36 for sensing high and low temperature conditions. These are more particularly described and discussed in connection with FIGS. 6A–6C and 7. However, although such thermostatic element(s) may be mounted in any convenient location, a housing 34 is provided within which float valve 35 and thermostatic element 36 are positioned.

Figure 4A:
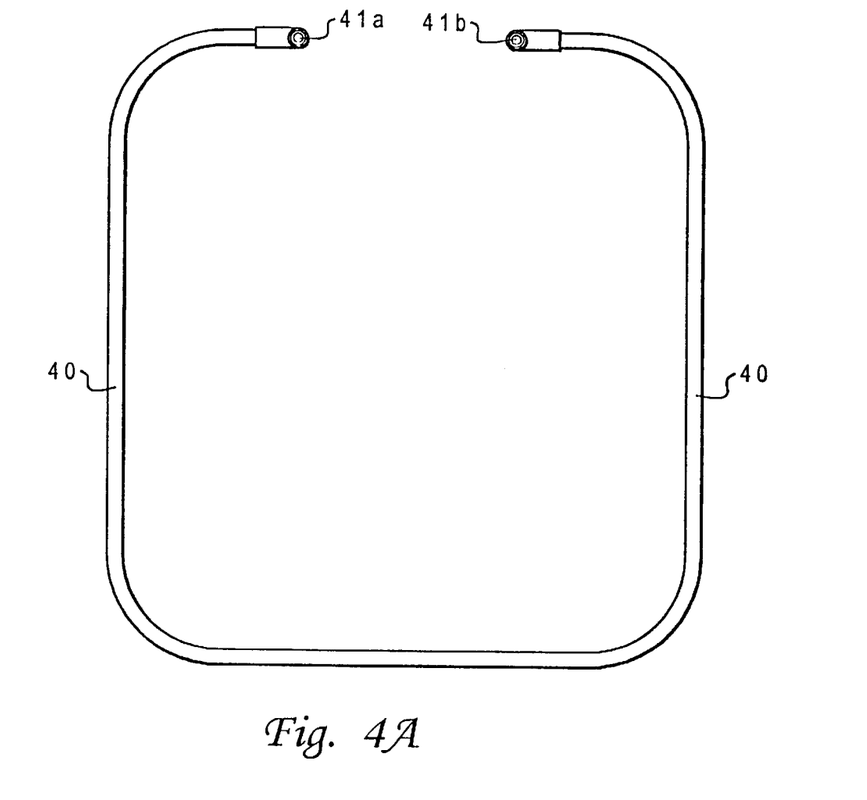
FIG. 4A is a detailed view illustrating the preferred embodiment of a peripheral water inlet arrangement for disposition about the upper periphery of the watering bowl of FIGS. 1–3A.
Figure 4B:
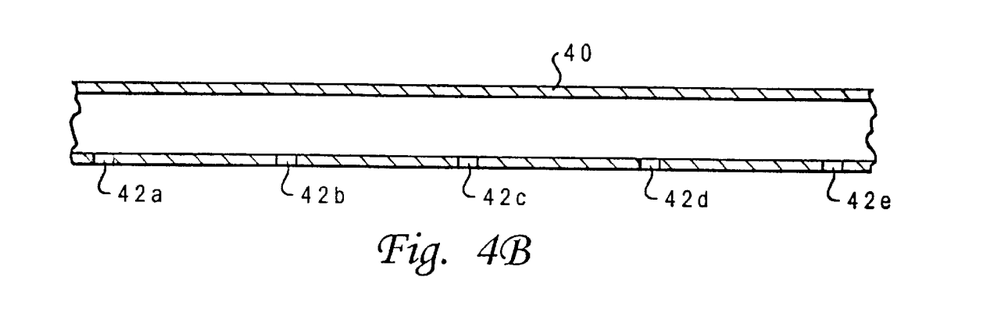
FIG. 4B is a detailed view illustrating spaced apertures longitudinally disposed along the lower surface of the water inlet of FIG. 4A.

Now turning to FIGS. 4A and 4B, there will be seen details of the peripheral tubing 40 which extends substantially around the upper periphery of dish 13 and through which fluid (e.g., water) is introduced to fill the dish. The tubing 40 is seen to have at its two ends, intake ports 41a and 41b which are preferably (but not necessarily) connected to two separate tubes 30 and 31 through sections 30a and 31a respectively (FIG. 1). Within the lower surface of peripheral tubing 40 there are provided a plurality of spaced apertures 42a–42n (as illustrated by apertures 42a–42e) extending thereabout to provide a corresponding plurality of jets of fluid directed downwardly so that when tubing 40 is mounted on bowl 13 (as shown), the plurality of jets sweep downwardly along the inner sides of the bowl to aid in keeping them clean. Although provision is made for connection to two separate tubes 30 and 31, it should be understood that if desired, only one such tube could be employed and that the two intake ports 41a/41b could either both be fed from one tube or one port could be plugged and fluid introduced solely through the other.

Figure 5A:
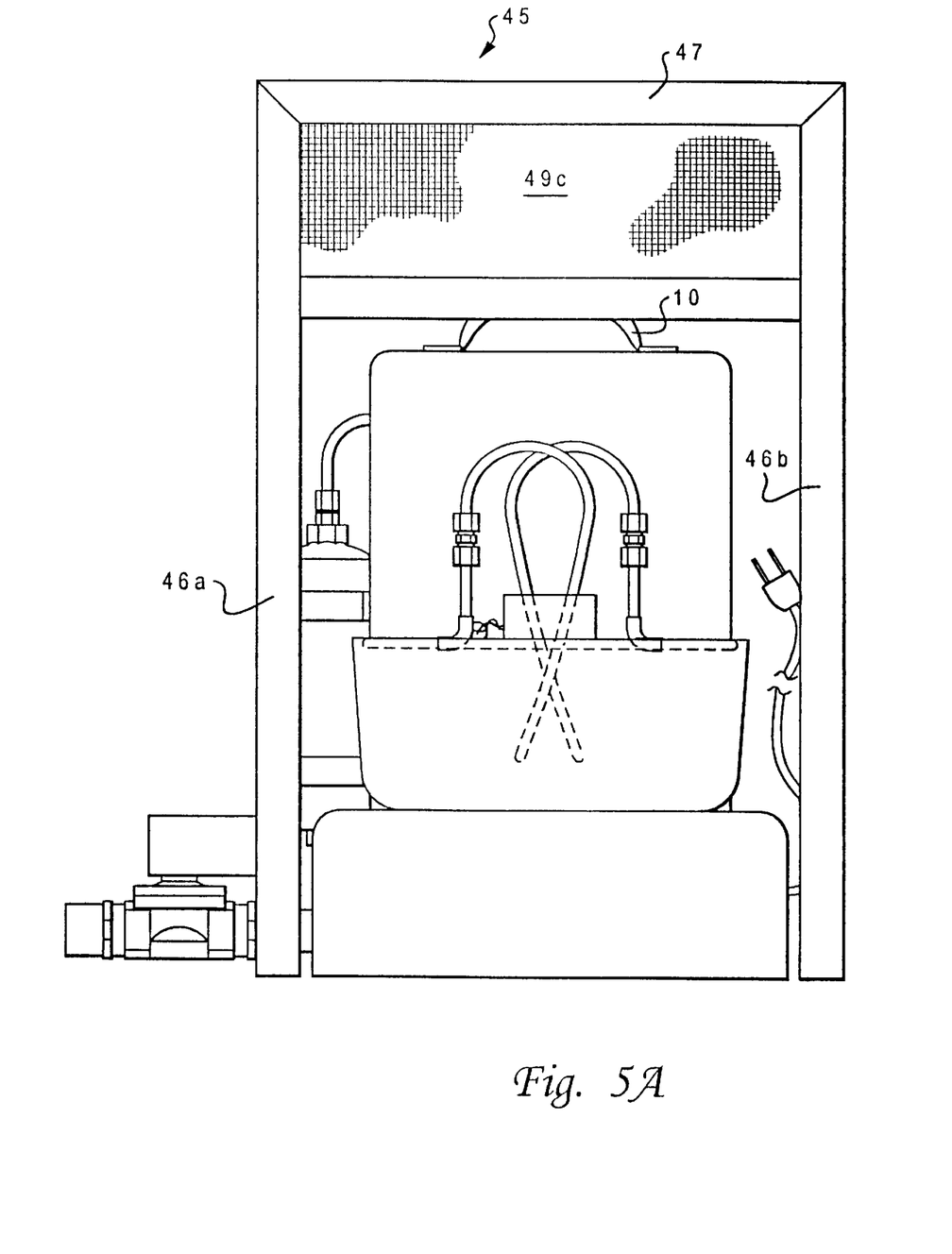
FIG. 5A is a front view illustrating a removable partially protective shield in place about the embodiment of FIGS. 1–3A.
Figure 5B:
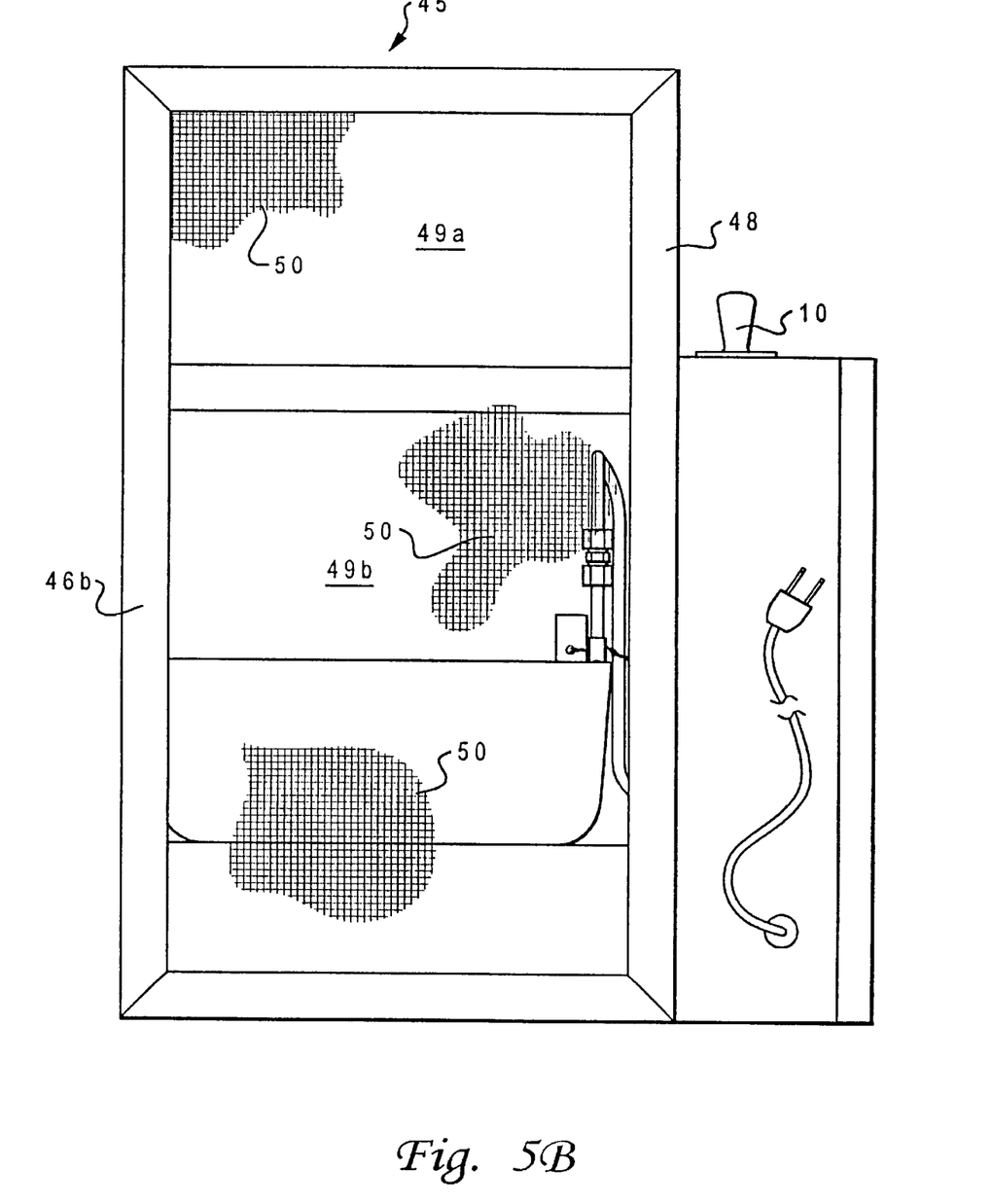
FIG. 5B is a side view illustrating the removable shield of FIG. 5A.

As previously mentioned, it is desired to prevent the fluid in the dish 13 from rising to an elevated temperature where it is too hot to be palatable or decreasing to become too cold so that it is about to freeze. As used herein, the term "Elevated Temperature" is meant to be a temperature at which the fluid is too hot to be palatable to the animal for which it is intended. To assist in preventing unnecessary warming in summer heat, and also to aid in preventing deposit of dust, dirt, leaves and the like, there may be provided an optional partial screen or housing 45 as depicted in FIGS. 5A and 5B. FIG. 5A is a front view depicting the housing 45 partially surrounding the frame 11 of the watering assembly. The frame preferably has two upstanding side members 46a/46b, a top 47 bridging between members 46a/46b, and a rear upstanding frame partially shown as 48 in FIG. 5B. As will be observed from the drawing, there may be a plurality of side, back and front panels 49a–49n (49a–49c as shown) made of screen or mesh 50; or, such panels may be made of solid material as represented by the solid regions in the figures. To provide ease of use, the housing 45 is made to fit about the forward part of the entire fluid dispensing assembly as shown. However, it will be amply evident to those skilled in the art that it could be made sufficiently large to fit over the entire unit. Moreover, it should be noted that both the entire fluid dispensing assembly and/or the housing 45 may include conventional flanges or studs to facilitate secure fastening to a supporting pad or anchor.

Figures 6A, 6B, 6C:
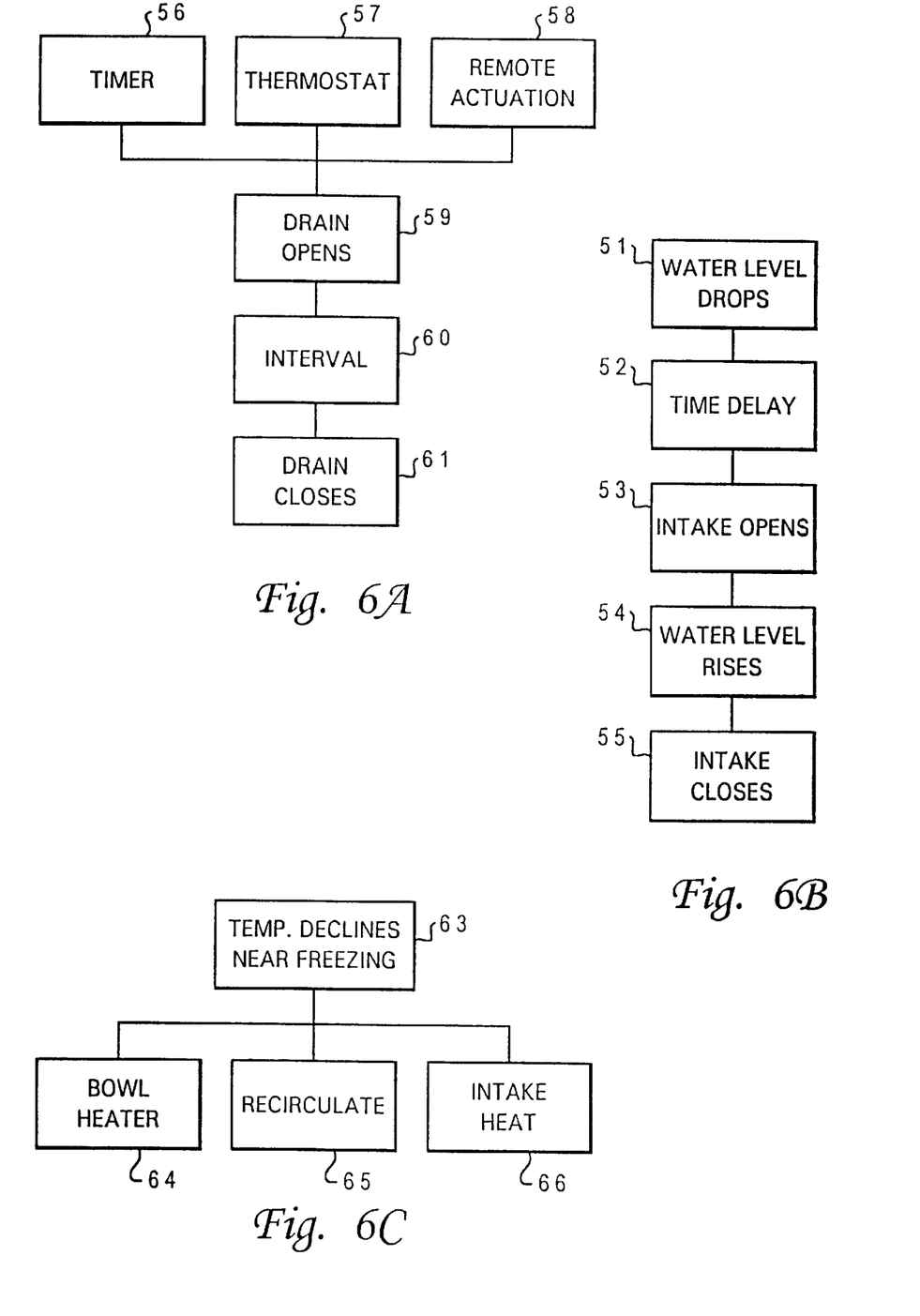
FIG. 6A is a flow diagram depicting the sequence of actions relating to the intake valve.
FIG. 6B is a flow diagram depicting the sequence of actions relating to the drain valve.
FIG. 6C is a diagram illustrating operation of optional cold weather accessories.
Figure 7:
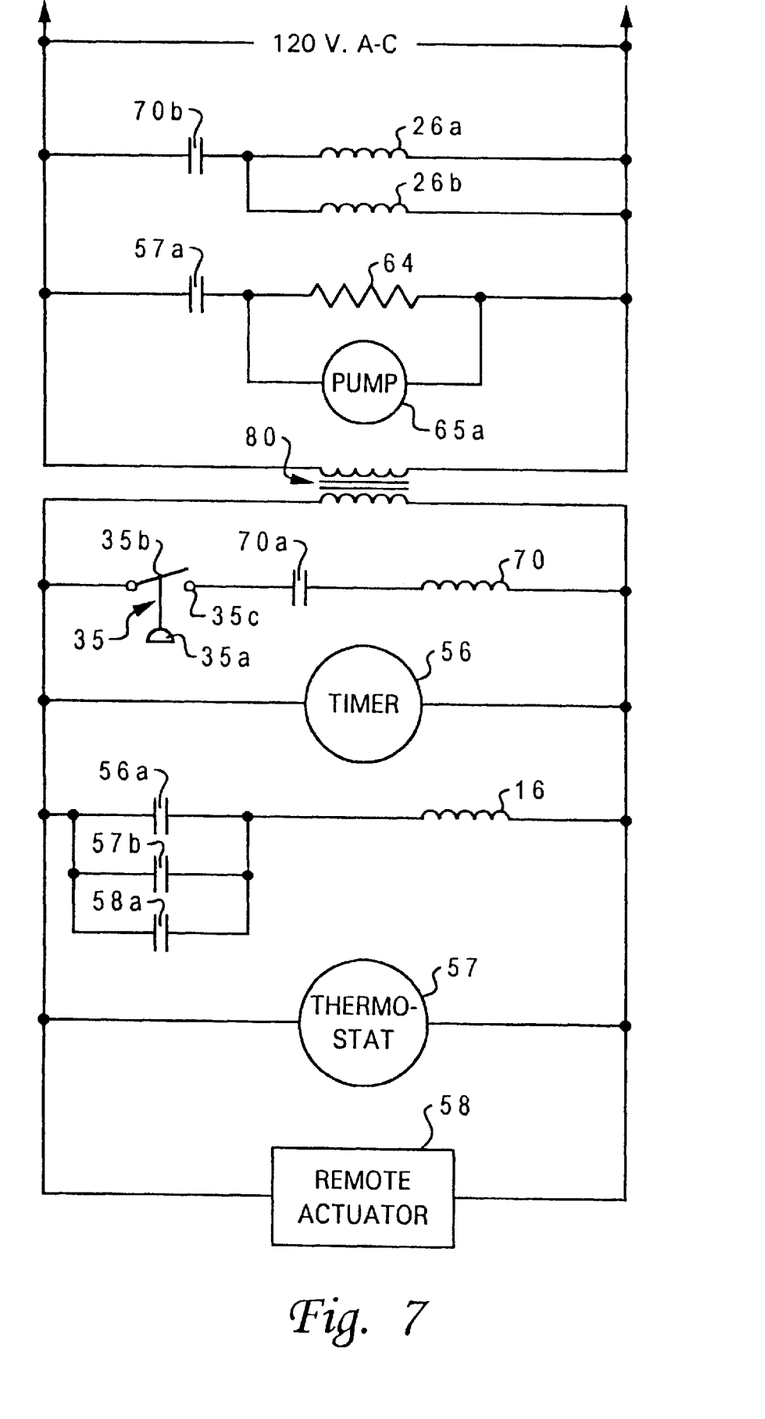
FIG. 7 is a schematic diagram of the electrical circuitry and controls for the system.

Operation of the equipment is represented by the diagrams of FIGS. 6A–6C. When fluid (e.g., water) in dish 13 drops (represented by numerals 51) to a predetermined selectable level represented by levels 14a–14h (usually one of the lower levels), float valve 35 operates to energize time delay relay 70 (FIG. 7). After time delay 52, the above-described intake valve 26 opens (numerals 53) to admit fluid to the dish. When the level rises to a predetermined level (numerals 54) which can be adjusted by the equipment user, the float valve 35 operates to deenergize the relay 70 thereby resulting in the closing of intake valve 26, as represented by element 55 of FIG. 6B and stopping further flow of fluid into the bowl 13.

Of course, in addition to fluid level decline by virtue of the opening of the drain valve 16, the fluid level would be expected to decline because of consumption of the fluid by the animal or animals for whose use the equipment is intended. Irrespective of the cause of decline, the replenishment of fluid is accomplished as described above. However, in addition to decrease through consumption, provision is made for the drainage and replacement of the fluid as a result of any one of several conditions as now described in connection with FIG. 6A. There, it will be observed is shown a timer 56, a thermostat 57, and a remote actuator 58. Operation of any one of these elements 56–58 results in operation of drain valve 16 as described above and in connection with FIG. 7. The opening of drain valve 16 (numerals 59 in FIG. 6A) results in draining of fluid from bowl 13 whereupon the aforementioned float valve 35 operates to begin replenishment. By including interval of time 60, time is provided during which drainage continues for a predetermined period of time of overlap after intake 26 is opened, thus providing for flushing the dish 13 thoroughly. After conclusion of the time interval 60, the drain 18 closes (numerals 61), whereupon the dish fills with fluid until the float valve senses the filled condition and shuts off the intake solenoid valve 26.

As mentioned above, provision is made for optional additional features for preventing freezing in cold climates. To assist in understanding the invention, the term Low Temperature herein is meant to be a temperature substantially that at which water freezes. Cold weather operation is illustrated in FIG. 6C. When the temperature decreases to a low temperature near the freezing point (32 degrees fahrenheit for water) as symbolized by numerals 63, either the thermostat housed within housing 34 or an optional external thermostat closes contacts to do one or more of the following: energize a conventional bowl heater 64 to keep the fluid above freezing; activate a recirculating pump to recirculate the fluid to a remotely located conventional heater (numerals 65); and/or apply power to a heat tape or the like on the intake conduit to the apparatus so as to prevent freezing of fluid that may reside in the intake line (numerals 66).

To complete the description of the automatic liquid pet feeder, reference is now made to FIG. 7 which is a schematic electrical circuit diagram of the preferred embodiment. There, it will be seen, are the time delay relay serially connected with aforementioned float switch 35. As will observed from the depiction of switch 35, when fluid level declines to a predetermined point, the float declines to a point at which contacts 35b/35c close thus extending electric power to contacts 70a which, after the aforementioned time delay, close to energize the principal relay activating coil 70. When this occurs, power is extended through contacts 70b to power up intake valve 26 solenoid coils 26a and 26b thus resulting in the opening of intake valve 26 and the introduction of fluid to the bowl 13 as described above.

The diagram of FIG. 7 also includes a schematic representation of the aforementioned cold weather option. Thus, there are seen thermostat contacts 57a which extend electrical power to conventional electrical heating element 64 and recirculating pump 65a.

Also included in FIG. 7 is conventional step-down transformer 80 which is employed to reduce the normal 120 volts a-c line voltage to a level more conventionally employed for supervisory control, e.g., 24 volts a-c. It should be noted, however, that if the components shown in the lower part of FIG. 7 were suitable for direct operation from 120 volts, transformer 80 could be eliminated.

As mentioned above, any one of several conditions can result in opening of drain valve 16. These are reflected in the lower part of the schematic diagram of FIG. 7. There, are seen timer 56 whose contacts 56a close during the aforementioned predetermined time intervals; thermostat 57 whose contacts 57b close when fluid temperature rises to a predetermined level; and remote actuator 58 whose contacts 58a close upon command from a remote location. Remote actuator may be any one of a variety of such remote actuators (e.g., those similar to garage door openers) that are well known in the art.

It will now be evident that there has been described herein an improved automatic liquid dispenser that facilitates providing fluid such as drinking water to one or more pets or other animals, thus presenting a number of advantages.

Although the invention hereof has been described by way of a preferred embodiment, it will be evident that other adaptations and modifications may be employed without departing from the spirit and scope thereof. Thus, for example, multiple input valves could be employed, or a single input valve having but a single solenoid coil could be utilized.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. An automatic liquid dispenser for animals comprising:
   (a) a fluid receptacle having an intake and a drain;
   (b) intake valve control means including
      (i) an intake valve connected to said intake and
      (ii) first control means connected to said intake valve and including a liquid level sensor and time delay device for controllably operating said intake valve; and
   (c) drain valve control means including
      (i) a drain valve connected to said drain and
      (ii) second control means connected to said drain valve and including automatic means for opening and closing said drain valve during selected periods of time.

2. An automatic liquid dispenser according to claim 1 wherein said liquid level sensor is a float.

3. An automatic liquid dispenser according to claim 1 wherein said time delay device is a time delay relay.

4. An automatic liquid dispenser according to claim 1 wherein said automatic means includes a liquid temperature sensing element.

5. An automatic liquid dispenser according to claim 4 wherein said temperature sensing element is adjustable to actuate at either an elevated or low temperature.

6. An automatic liquid dispenser according to claim 4 wherein said temperature sensing element is adjustable to actuate at an elevated and a low temperature.

7. An automatic liquid dispenser according to claim 1 wherein said automatic means includes an adjustable timer.

8. An automatic liquid dispenser according to claim 1 further including remotely actuable means for actuating said drain valve.

9. An automatic liquid dispenser according to claim 7 wherein said liquid level sensor is a float.

10. An automatic liquid dispenser according to claim 7 wherein said time delay device is a time delay relay.

11. An automatic liquid dispenser according to claim 7 wherein said adjustable timer is an adjustable time clock.

12. An automatic liquid dispenser according to claim 7 further including a second intake valve.

13. A method of furnishing cool fresh water for animals comprising:
    (a) providing a dish for holding said water;
    (b) forming an intake and a drain in said dish;
    (c) positioning an intake valve in said intake and a drain valve in said drain;
    (d) sensing fluid level in said dish and
       (i) when said fluid level falls to a first predetermined level, generating a first electrical signal,
          1. disabling said first electrical signal until after a predetermined adjustable time delay,
          2. enabling said first electrical signal at the end of said predetermined time delay, and
          3. conducting said first electrical signal, after enabling, to said intake valve thereby to open said intake valve to admit water to said dish;
       (ii) when said fluid level rises to a second predetermined level, closing said intake valve.

14. The method of claim 13 further including steps of:
    (a) connecting a timer to said drain valve and
    (b) periodically sending an electrical signal from said timer to said drain valve to periodically open said drain valve and drain water from said dish.

15. The method of claim 14 further including a step of controlling time during which said drain valve is open to cause said drain valve to remain open during an adjustable time interval after said dish is drained.

16. The method of claim 14 further including a step of including a second intake valve to said dish.

17. The method of claim 14 further including a step of sensing temperature of liquid in said dish and, when said temperature exceeds a first pre-set level, sending an electrical signal to said drain valve to open said drain valve and drain water from said dish.

18. The method of claim 14 further including a step of sensing temperature of liquid in said dish and, when said temperature declines to a second pre-set level, sending an electrical signal to said drain valve to open said drain valve and drain water from said dish.

19. A method of operating an animal liquid dispensing system having a dish, a drain valve, an intake valve, a faucet, a conduit connecting said faucet and said intake valve, said method comprising steps of:
    (a) periodically opening said drain valve and draining contents of said dish,
    (b) opening said intake valve and retaining said intake valve in its opened state for a first period of time sufficient to completely flush initial contents of said conduit,
    (c) maintaining said drain valve open for another period of time sufficient to completely drain said initial contents of said conduit from said dish,
    (d) when said another period of time has expired, closing said drain valve, and
    (e) maintaining said intake valve in its open condition until level of liquid in said dish reaches a predetermined level.

20. The method of claim 19 wherein said first period of time overlaps said another period of time.

* * * * *